United States Patent [19]

Ziolo et al.

[11] Patent Number: 5,667,716
[45] Date of Patent: Sep. 16, 1997

[54] HIGH MAGNETIZATION AQUEOUS FERROFLUIDS AND PROCESSES FOR PREPARATION AND USE THEREOF

[75] Inventors: Ronald F. Ziolo, Webster, N.Y.; Elizabeth C. Kroll, Clinton Township, Mich.; Rachel Pieczynski, Orchard Park, N.Y.

[73] Assignee: Xerox Corporation, Stamford, Conn.

[21] Appl. No.: 674,306

[22] Filed: Jul. 1, 1996

[51] Int. Cl.⁶ ................................................. H01F 1/28
[52] U.S. Cl. ........................ 252/62.52; 252/67.54
[58] Field of Search ..................... 252/62.52, 62.54

[56] References Cited

U.S. PATENT DOCUMENTS

| | | | |
|---|---|---|---|
| 4,474,866 | 10/1984 | Ziolo | 430/106.6 |
| 4,992,190 | 2/1991 | Shtarkman | 252/62.52 |
| 5,013,471 | 5/1991 | Ogawa | 252/62.52 |
| 5,219,554 | 6/1993 | Groman et al. | 424/9 |
| 5,354,488 | 10/1994 | Shtarkman | 252/62.52 |
| 5,457,523 | 10/1995 | Facci et al. | 355/219 |

*Primary Examiner*—Melissa Bonner
*Attorney, Agent, or Firm*—John L. Haack

[57] ABSTRACT

A ferrofluid comprising an aqueous suspension of an unsilanated or silanated nanocomposite comprised of $Fe_2O_3$ nanoparticles and an ionic exchange resin, wherein the ferrofluid has a high magnetization moment of about 20 to about 40 emu/gram.

23 Claims, No Drawings

HIGH MAGNETIZATION AQUEOUS FERROFLUIDS AND PROCESSES FOR PREPARATION AND USE THEREOF

REFERENCE TO COPENDING APPLICATIONS AND ISSUED PATENTS

Reference is made to commonly assigned copending applications: U.S. Ser. No. 08/178,540 (90063 I) filed Jan. 7, 1994, entitled "Magnetic and Nonmagnetic Particles and Fluid, Methods of Making and Methods of Using the Same", which discloses low optical density magnetic fluids for use in liquid development compositions and wherein a submicron particle size ion exchange resin may be selected to avoid further micronization or particle size reduction processing steps, now U.S. Pat. No. 5,567,564; U.S. Ser. No. 08/290,125 (D/93433) filed Jul. 15, 1994, entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; U.S. Ser. No. 08/332,174 (D/94178) filed Nov. 31, 1994, entitled "Magnetized Pigments and Method and Apparatus for Producing Magnetized Pigments", which discloses a method and apparatus for producing magnetized pigments by forming a pigment coating on an external surface of a magnetic material core. The magnetized pigment is produced by forming a vaporized core of a magnetic material and forming the pigment coating on the magnetic material core; U.S. Ser. No. 08/500,215 (D/94863) filed Jul. 10, 1995, entitled "Magnetic Compositions and Processes for Making and Using", now U.S. Pat. No. 5,641,424; U.S. Ser. No. 08/584,585 (D/95365) filed Jan. 11, 1995, entitled "Magnetic Nanocompass Compositions and Processes for Making and Using"; and U.S. Ser. No. 08/600,642 (D/96028) filed Feb. 14, 1996, entitled "Superparamagnetic Image Character Recognition Compositions and Processes of Making and Using".

Attention is directed to commonly owned and assigned U.S. Pat. Nos.: 4,474,866, issued Oct. 2, 1984, entitled "Developer Compositions Containing Superparamagnetic Polymers" which discloses a developer composition containing superparamagnetic polymers; 5,322,756, issued Jun. 21, 1994, entitled "Expedient Method for the Preparation of Magnetic Fluids and other Stable Colloidal Systems"; Submicron Particles", which discloses submicron particles which are dispersible to form an aqueous colloid. Also disclosed is a method of forming the stable dispersion which includes providing an ion exchange resin, loading the ion exchange resin with an ion, and treating the loaded resin to form nanoscale particles. The resin and nanoparticles can be fluidized to form an aqueous stable colloid. Also of interest is U.S. Pat. No. 5,358,659, issued Oct. 25, 1994, entitled "Magnetic Materials with Single-Domain and Multidomain Crystallites and a Method of Preparation", and U.S. Pat. No. 5,457,523, issued Oct. 10, 1995, entitled "Ferrofluid Media Charging of Photoreceptors".

The disclosures of each the above mentioned patents and copending applications are incorporated herein by reference in their entirety.

BACKGROUND OF THE INVENTION

This invention is generally directed to magnetic nanocomposite compositions and processes for the preparation thereof, and more specifically the present invention is directed to ferrofluids comprising aqueous suspensions of magnetic nanocomposite compositions, silanated magnetic nanocomposite compositions, and mixtures thereof, comprised of, for example, $Fe_2O_3$ nanoparticles and an ionic exchange resin. In embodiments, the ferrofluids of the present invention possess a high magnetization moments, for example, from about 20 to about 40 emu/gram, and a high "spike" or spicule forming property which renders the compositions useful for improving a variety of conventional ferrofluid properties and enables new applications thereof such as a liquid ink droplet ejection composition and system as illustrated herein.

The colored, nearly optically transparent aqueous magnetic ferrofluid compositions of the present invention are useful in magnetic applications, for example, magnetic imaging and printing with dry and liquid developer compositions, and for electrophotography, especially xerographic imaging and printing. Other applications of the ferrofluids of the present invention include: those disclosed in the prior art, reference for example, *Magnetic Fluids Guidebook: Properties and Applications*, V. E. Fertmann, Hemisphere Publishing Corp., N.Y., 1990, and other novel uses, such as, in a magnetically controlled charge transfer media and charging apparatus for a photoreceptor as disclosed in, for example, commonly assigned U.S. Pat. No. 5,457,523; in reversibly magnetically controlling the extent of exposed or spiked ferrofluid surface area; and as magneto-mechanical seals in, for example, hi-fi speakers and liquid printing apparatus.

The ferrofluid compositions of the present invention possess unique electrical, optical, magnetic, and chemical properties due primarily to the extremely small dimensions, for example, about 10 nanometers and below, of the nanocrystalline particles in the nanocomposite.

An important limitation to the preparation and maintenance of nanoscale materials has been the tendency of the initially small atomically clustered particles to aggregate into larger masses to reduce the energy associated with the high surface area to volume ratio of the nanosized particles. In the aforementioned U.S. Pat. No. 4,474,866, a polymeric matrix, for example, a synthetic ion exchange resin is used to prepare, stabilize, isolate, and characterize related nanocrystalline $Fe_2O_3$ particles as a magnetic polymer composite. In the present invention, there are formulated various magnetic nanocomposites and ferrofluids thereof comprised of, for example, nanocrystalline particles of $Fe_3O_4$, $Fe_2O_3$, and the like magnetic metal oxides, and ionically active resin matrices. The nanocomposites are subsequently processed in accordance with the present invention to form high magnetization aqueous ferrofluid formulations.

Prior art formation of submicron or nanometer structures have predominantly included the formation of large particles which are subsequently ground or milled until particles of the desired size are achieved. The grinding and milling times associated with the formation of such particles ranged from 120 to about 2,900 hours. A method of forming dry magnetic submicron particles by precipitation of a magnetic oxide in an ion exchange resin is exemplified by Ziolo in the aforementioned U.S. Pat. No. 4,474,866. According to the method employed therein, an ion exchange resin is loaded with a magnetic ion and chemically converted to a magnetic oxide $Fe_2O_3$. The resulting magnetic iron oxide loaded ion exchange resin is then recovered and dried. The magnetic polymer resin is then optionally micronized to form a fine magnetic powder.

The following patents are of interest:

U.S. Pat. No. 5,013,471 to Ogawa, issued May 17, 1991, discloses a magnetic fluid, a method for the preparation thereof, and a magnetic seal apparatus using the same, characterized in that the surfaces of ferromagnetic particles are covered with a monomolecular adsorbed film composed of a chloro-silane type surfactant, and the coated particles are dispersed in an oil.

U.S. Pat. No. 5,354,488 to Shtarkman et al., issued Oct. 11, 1994, discloses a rheological fluid composition which is responsive to a magnetic field. The composition comprises a vehicle, magnetizable particles suspended in the vehicle, and a dispersant. The dispersant comprises particles having no dimension greater than 10 nanometers. The dispersant is preferably carbon.

U.S. Pat. No. 4,992,190 to Shtarkman et al., issued Feb. 12, 1991, discloses a rheological fluid composition which is responsive to a magnetic field. The composition comprises magnetizable particulate, silica gel as a dispersant and a vehicle. A preferred magnetizable particulate is insulated, reduced carbonyl iron. The silica gel has an average particle size, typically, of about 0.05 micrometers.

U.S. Pat. No. 5,219,554, to Gorman et al., issued Jun. 15, 1993, discloses hydrated biodegradable superparamagnetic metal oxides exhibiting certain magnetic and biological properties suitable for use as magnetic resonance imaging agents to enhance magnetic resonance images of animal organs and tissues. Certain metal oxides which can be superparamagnetic are in the form of dispersoids or fluids which employ carrier fluids which are physiologically acceptable and are uncoated or surrounded by a polymeric coating to which biological molecules can be attached. Superparamagnetic fluids containing silanized iron oxides can be prepared by first subjecting the iron oxides to sonication to form oxyhydroxides, followed by the addition of the organosilane compound and further sonicated to disperse the materials, and thereafter, the silane is attached or associated to the surface via a dehydration reaction. The polymerization of the silane may occur before or after the deposition on the surface of the oxyhydroxide, reference col. 16, lines 38 to 46. Measured magnetic properties of certain superparamagnetic fluids at high magnetic field were nearly as magnetic as ferromagnetic iron oxide and far more magnetic than the paramagnetic ferric oxyhydroxide, showing high magnetic saturation. The fluids are superparamagnetic and lose virtually all of their magnetic moment in the absence of an applied magnetic filed, reference col. 29, lines 13 to 20.

The disclosures of each the above mentioned patents are incorporated herein by reference in their entirety.

There remains a need for high magnetization ferrofluids with high spiking or spicule forming properties and economical and convenient processes of obtaining very small magnetic particles and magnetic polymeric materials, and more specifically micron and submicron magnetic polymeric particles, without the complications and disadvantages encountered in the prior art.

Still further, there is a need for processes for the preparation of aqueous ferrofluids of highly magnetic nanocomposite particles that permit low cost, clean, and highly magnetic, ferrofluid formulations that can be selected as a magnetic liquid, and utilized in applications such as a additive component in dry or liquid electrophotographic developer compositions, carrier powder coatings, photoconductor pigment or resin coating suspensions, and as toner additives for enhanced photoreceptor development and cleaning.

SUMMARY OF THE INVENTION

It is an object of the present invention to provide ferrofluids and processes thereof with many of the advantages illustrated herein.

It is an object, in embodiments, of the present invention to overcome deficiencies of prior art preparative processes for high magnetization ferrofluid compositions.

It is another object, in embodiments of the present invention, to provide simple and economical processes for the preparation of stable ferrofluids comprising aqueous suspensions of a silanated metal oxide nanocomposite comprised metal oxide nanoparticles and an ionic exchange resin, wherein the ferrofluids have high magnetization moments and other useful properties as illustrated herein.

Another object of the present invention, in embodiments, is to provide aqueous ferrofluid compositions with high spiking or spicule forming properties, and wherein the spiking is substantially completely and readily reversible in the absence of a magnetic field.

Another object of the present invention resides in the provision of simple and economical processes for the preparation of low cost, clean, that is, with substantially no impurities, aqueous ferrofluids with well defined particle size distribution properties of highly magnetic nanocomposite particles.

In another object of the present invention, in embodiments, there is provided aqueous ferrofluid compositions with variable surface tension and variable water wetting properties.

In still another object of the present invention, in embodiments, there is provided an apparatus for ejecting liquid droplets from a liquid ink printing device wherein the aqueous ferrofluid compositions and spiking properties thereof provide a magnetically controllable liquid droplet ejector or ejection means.

These and other objects of the present invention are accomplished in embodiments thereof by providing aqueous ferrofluids containing magnetic nanocomposite compositions. More specifically, the present invention is directed to ferrofluid compositions comprising a continuous aqueous suspension of a discontinuous phase of unsilanated nanocomposite particles, silanated nanocomposite particles, and mixtures thereof, comprised of metal oxide nanoparticles and an ionic exchange resin, wherein the ferrofluid has a high magnetization moment and high spiking properties.

Advantages of the present invention, in embodiments, include, providing processes for the preparation of ferrofluids with very high magnetization properties; unexpectedly and unusually high "spiking" properties; ease of preparation, wherein about 96% less time is expended in the post milling process operations compared to the prior art, reference for example, U.S. Pat. No. 5,322,756, to Ziolo; and enabling applications such as tactile teleoperation and communication, novelty/toys, and the like The silanated magnetic nanocomposite compositions of the present invention also have a low wetting property with respect to water and with respect to hydrophilic surfaces, such as glass. Aqueous ferrofluid compositions of the present invention are further distinguished from prior art ferrofluids in that they possess exceptional thermal stability, for example, a substantially infinite self life at ambient and elevated temperatures compared to typically about 1 to about 3 months for commercially available ferrofluid compositions, for example, available from Ferrofluidics. The ferrofluids and the nanocomposite compositions of the present invention are typically dark black in color as concentrated or bulk suspensions, and a weak reddish brown appearance as coatings or thin films. The ferrofluids of the present invention have inherent transparent or semi-transparency as thin films or coatings.

Applications of the compositions of the present invention include, for example, Aquatron charging, that is, to control charging of water droplets, reference the aforementioned commonly owned U.S. Pat. No. 5,457,523. The ferrofluid compositions of the present invention are useful, for example, in mechanical and magnetic seals, in high fidelity speakers, in display devices, and in liquid ink or developer based printers, wherein the nozzles or jet openings may be controllably spiked for the purpose of forming marking fluid droplets. Other applications of the fluids of the present invention are disclosed in the aforementioned *Magnetic Fluids Guidebook: Properties and Applications*, V. E. Fertman, Hemisphere Publishing Corp., N.Y., 1990, the disclosure of which is incorporated herein by reference in its entirety.

These and other aspects of the present invention are achieved by providing, in embodiments, stable ferrofluids comprising aqueous suspensions of silanated and or unsilanated metal oxide nanocomposites comprised metal oxide nanoparticles and an ionic exchange resin, wherein the ferrofluids have high magnetization moments and other useful and advantageous properties as illustrated herein.

DETAILED DESCRIPTION OF THE INVENTION

Compositions of the present invention, in embodiments, can be prepared by processes comprising providing a low optical density magnetic composition comprising nanocomposite particles comprising, for example, $Fe_2O_3$ nanoparticles and an ionic exchange resin; milling, preferably in a dry state, the low optical density magnetic composition; adding a liquid, such as an aqueous liquid vehicle, to the composition and thereafter milling, preferably in a wet state, the resulting mixture to form a colloidal suspension; treating the colloidal suspension, for example using centrifugation or other known and related gravitational-density difference separation methods, to form a supernatant and a residue, and thereafter separating the supernatant from the residue; and exposing the residue to a magnetic field, such as a bar magnetic or other suitable electromagnetic source so as to generate, or in the alternative separate, a highly magnetic component and non magnetic and low magnetic sludge components, wherein the highly magnetic component is an aqueous ferrofluid composition with a high magnetization moment of about 20 to about 40 emu/gram. In embodiments, the preparative process can include treatment of the resulting high magnetization ferrofluid with a silanating agent which, although not wanting to be limited by theory, is believed, for example, to react with certain reactive functional groups on the surface of the magnetic nanocomposite particles forming a covalently or physically adsorbed hydrophobic or low water wetting coating on the particles; undergo partial or complete hydrolysis to form, for example, an oligomeric or polymeric siloxane component; or react or adsorb on the surface of the vessel, such as glass or oxidized metal surfaces, used to conduct the silanation treatment thereby altering the surface properties thereof and the interaction with the suspended nanocomposite particles.

The aforementioned magnetization and separation of the high magnetization component from the low and non magnetic components, if desired, is facilitated by optionally first accomplishing treatment of the mixture with a silanating agent and thereafter accomplishing the magnetization and separation of the supernatant and the sludge components.

Included within the scope of the present invention are magnetic particles which are substantially magnetically equivalent or similar to nanocomposite compositions comprising a nanocrystalline metal oxide and a ionic or ion binding resin, such as nanocrystalline $Fe_3O_4$ uniformly dispersed and ionically associated with a sulfonated ion exchange resin, reference for example, the aforementioned copending U.S. Ser. No. 08/290,125 (D/93433), the disclosure of which is totally incorporated herein by reference.

The magnetic nanocrystalline particles of the present invention when contained in a polymeric matrix have, for example, particle sizes of from less than about 0.1 to about 100 microns in volume average diameter as determined by a scanning electron microscope or Malvern System 3601 particle size analyzer.

Although not wanting to be limited by theory, the aforementioned exceptional stability, for example, the shelf life stability of the aqueous suspension ferrofluid compositions of the present invention, is believed to be attributable to, or related to the a thick hydration layer or hydrogel layer which forms at or on the surface of the nanocomposite particles thereby rendering the particles highly resistant to agglomeration, aggregation, or precipitation phenomena. In embodiments of the present invention, the ferrofluids possess a self life of from 1 to about 36 months at ambient and elevated temperatures. The ferrofluids compositions of the present invention, in embodiments, possess a high spiking or spicule forming property wherein the spicules or spikes are from about 1.0 to about 20 millimeters in height, wherein the spikes have a high aspect ratio of, for example, about 1:25, and a spicule resolution of about 1.0 millimeter at half peak height measured at a magnetic field of from about 200 to about 10,000 Gauss. "Spiking" phenomena is known and has been reported in the prior art, reference for example, the aforementioned Fertman citation with a aspect ratios of typically about 1:1, and a resolution of about 1 centimeter, and a half height peak width of about 1 centimeter which prior art spiking is considerably less than the spiking observed in the present ferrofluid compositions when observed at comparable magnetic field strengths.

Thus, the applied magnetic field strength range used to magnetize and induce the high spiking phenomena in the compositions of the present invention are relatively low and thereby enable numerous advantages and applications compared to spike forming compositions reported in the literature, for example, wherein an aspect ratio of about 1:1 and a spicule resolution of about 1 centimeter is observed at a comparable magnetic field strengths, reference for example the commercially available ferrofluids as disclosed herein.

In embodiments of the present invention, $Fe_2O_3$ nanoparticles are present in amounts of from about 20 to about 50 weight percent, and the ionic exchange resin is present in an amount of from about 80 to about 50 weight percent, and an aqueous phase is present in an amount of about 50 to about 90 weight percent based on the total weight of the ferrofluid. The aqueous phase can be comprised of water or a mixture of water and a water miscible solvent, such as glycols, glycol ethers, and the like, in admixture with from about 10 to about 50 weight percent magnetic solids.

The aqueous ferrofluids of the present invention are stable over a broad pH range, for example, from about 4 to about 12, and preferably of from about 5 to about 10. At pH values less than about 5, the iron oxides can begin to dissolve unless precautions are taken to prevent the dissolution, such as providing a water impermeable coating on the magnetic nanoparticle surfaces. In embodiments, the metal oxide nanoparticles can have a volume average diameter of about 1 to about 10 nanometers.

The aqueous ferrofluids of the present invention typically have a viscosity greater than or equal to the viscosity of water at about 25° C., and which viscosity can be easily altered by the addition various additives, for example, viscosity index improvers, surfactants, thickeners, and the like known additives. The viscosity properties of the aqueous suspensions, in embodiments, range from about $10^{-3}$ to about $10^{-1}$ Pa×sec which makes the suspensions suitable for liquid ink marking applications. The aqueous ferrofluids, and particularly the silanated ferrofluid embodiments, typically have low wetting properties with respect to hydrophilic surfaces, for example, glass and certain metal oxides of metals or alloys. In embodiments, it is possible to "over silanate", that is, employ an excess of silanating agent, in amounts of, for example, greater than about 10 to 30 weight percent and above, wherein the resulting viscosity properties of the ferrofluid are relatively high, for example, greater than $10^{-1}$ Pa×sec which can render the suspensions unsuitable for some of the aforementioned applications while rendering the ferrofluids highly suitable for other applications such as formulating nanocompass and related compositions and articles, reference for example, the aforementioned copending applications U.S. Ser. No. 08/584,585 (D/95365) and U.S. Ser. No. 08/600,642 (D/96028).

In an exemplary preparative process of a high magnetization aqueous ferrofluid composition of the present invention, there is provided a low optical density magnetic composition comprising a nanocomposite of particles comprising $Fe_2O_3$ nanoparticles and an ionic exchange resin; dry milling the low optical density magnetic composition; adding an aqueous liquid vehicle to the composition and thereafter wet milling the resulting mixture to form a colloidal suspension; centrifuging the colloidal suspension to form a supernatant and a residue, and thereafter separating the supernatant from the residue; and exposing the residue to a magnetic field to separate a highly magnetic component from a non- and low magnetic sludge components, wherein the highly magnetic component is an aqueous ferrofluid composition with a high magnetization moment of about 20 to about 40 emu/gram. In embodiments of the present invention, the aforementioned preparative process can further comprise treating the resulting aqueous ferrofluid composition with a reactive organosilane compound to form a silanated aqueous ferrofluid composition having a viscosity greater than or equal to the viscosity of water at about 25° C., and wherein the surfaces of the magnetic nanocomposite particles of the ferrofluid are coated with or are covalently bonded with the organosilane compound, are in admixture with the silane compound, or a product arising from hydrolysis thereof.

Suitable reactive organosilane compounds include chlorotrimethyl silane, dichlorodimethyl silane, and the like compounds. Other suitable organosilane compounds are disclosed in *Silicon Compounds, Register and Review*, published by Petrach Systems, Bristol, Pa., (1982), for example, trialkylsilylchlorides and dialkyl silydichlorides, and in *Silane Coupling Agents*, by Edwin Plueddemann, 2nd Ed., Plenum Press, 1991, the disclosures of which are totally incorporated herein by reference. The reactive organosilane compound can be, for example, mono-, di-, and tri-halo substituted silane compounds containing substitutents independently selected from, for example, alkyl groups with from 1 to about 20 carbon atoms, aryl, and alkylaryl groups, with from 6 to about 25 carbon atoms. A preferred class of silanating agents is fluorocarbon substituted silanes of the type trifluoroalkyl alkyl dihalosilane. A particularly preferred silanating agent, in embodiments of the present invention, is 3,3,3-trifluoropropyl methyl dichlorosilane. The silanating reactants can be used in any suitable amounts such that the objects of the present invention are achieved and after consideration of the aforementioned chemical reaction stoichiometrics involved, and the magnetic and physico-mechanical properties desired in the final product. The reactive organosilane compound is used, in embodiments, in an amount of from about 0.01 to about 2 weight percent based on the weight percent of the nanocomposite solids content of the aqueous ferrofluid.

It is readily appreciated by one of ordinary skill in the art that the aforementioned materials used for modifying the surfaces of the ferrofluid particles is not limited to a silane type compound illustrated herein, since it is possible to use other types of surface reactive compounds which can provide a product with comparable properties, for example, titanates and other reactive metal alkoxylates.

The resulting aqueous silanated ferrofluid compositions of the present invention, in embodiments, can have magnetization moments of about 30 to about 38 emu/gram. In embodiments, the magnetization moment of the aqueous ferrofluid compositions can be controlled to a high degree, for example, to within less than about 1 emu/gram by carefully selecting the loading of the metal oxide particles to the resin matrix, the ratio of nanocomposite to aqueous phase, dilution of the active magnetic solids with other non magnetic solids or liquids, the extent magnetization and purification of the initial and subsequently silanated products, and the like considerations.

In other embodiments of the present invention, there is provided a imaging apparatus and method of imaging thereof comprising: providing a nonmagnetic liquid ink print head having a nozzle and a supply of liquid ink provided thereto, an integral reservoir which accommodates a portion of an aqueous ferrofluid said reservoir is in communication with the liquid ink supply and nozzle, and a switchable magnetic member which is in close proximity to the ferrofluid reservoir; and activating the switchable magnetic member to produce a magnetic field in proximity to the aqueous ferrofluid causing spicules to form in the aqueous ferrofluid so that the liquid ink is displaced from the liquid print head in droplet form and directed to a receiver member to form an image. In corollary embodiments, activating the switchable magnetic member can be accomplished repeatedly, for example, with computer and microcircuit control means, in rapid succession at predetermined intervals to form an image comprised of a series of droplets. Thus, the aqueous ferrofluids of the present invention can, in conjunction with suitable hardware components, provide a highly efficient and selective liquid ink ejection system.

In embodiments, "nanosized" refers to any particulate having dimensions of between about 1 nanometer and about 100 nanometers.

In embodiments, "nanocomposite" refers to magnetic material comprising a resin or polymer containing nanosized or nanoscopic magnetic particulates, such as nanosized crystals of, for example, an iron oxide or equivalent nanosized amorphous magnetic particles.

The magnetic nanocomposite compositions of the present invention are comprised of from about 0.001 to about 60 weight percent of nanocrystalline magnetic metal oxide particles; and from about 40 to about 99.9 weight percent of an ion exchange resin functioning as a polymeric matrix for the nanocrystalline magnetic metal oxide particles. Although not desired to be limited by theory, it is believed that preferred ranges or weight ratios of the magnetic metal oxide nanoparticles and the ion exchange resin are those which provide the smallest average magnetic metal oxide particle size properties and the largest specific magnetization properties without the composite becoming too brittle as described hereinafter. Preferred or optional weight ratios for particular applications may be readily determined by experiment as illustrated herein. The nanocrystalline magnetic metal oxide particles have a volume average particle size range of from about 1.0 to about 100 nanometers, and preferably from about 1.0 to 10 nanometers as determined by transmission electron microscopy.

The ion exchange resins useful in preparing the nanocomposite compositions of the present invention include those ion exchange resin polymers possessing chemically addressable sites dispersed throughout their matrix, or on their surface and which sites can be used to either generate a magnetic component in situ or cause the chemical binding of specific ionic metal species, such as Fe(II), which can be chemically or electrochemically converted into nanoparticulate magnetic species. Specific examples of these resins include sulfonated polystyrenes, strongly acidic polyphenolics, polysulfonic acids and salts thereof, weakly acidic polyacrylics with a pH of about 5 to 6, for example, polycarboxylic salts, weakly acidic chelating polystyrenes, and the like, with strongly acidic sulfonated polystyrenes available from Dow, Rohm & Haas, and Bio-Rad Labs, being preferred. Other suitable polymers can be selected provided they are of low optical density, or at a minimum have a non interfering color, and the like, including for example, any resins containing cation exchange or exchangeable species, such as a sulfonated polystyrene sodium salt, providing the objectives of the present invention are achieved. The term "non interfering color" is meant to indicate that colored resins may be used in formulating the nanocomposites and various powders and liquid dispersions that are useful as imaging and printing materials so long as the color of the resin does not substantially distort the appearance or optical transparency properties of the nanocrystals, the nanocomposites, the ferrofluids, and thin films thereof.

Generally, these ion exchange resin polymers are available commercially in the form of small spheres, or beads ranging in size from about 500 dry mesh to about 25 dry mesh and preferably from about 400 dry mesh to about 200 dry mesh. They are also available in powder form as, for example, sulfonated polystyrene sodium salt. These ion exchange polymer resins when containing for example, a magnetic nanocrystalline species prepared by processes of the present invention are referred to herein as magnetic nanocomposites.

Alternatively, the resin may be selected in a submicron size, for example, form about 0.05 to about 0.95 microns in volume average diameter, so that no additional micronization step is necessary. Examples of such a matrix include a submicron sulfonated polystyrene resin, available for example, from Rohm & Haas. Additional submicron resins which could be appropriate for use in the present invention include any submicron resins which do not interfere with the characteristics of the material disclosed herein.

Examples of cations contained in the ion exchange resin polymer matrix include those derivable from elements of group IA and IIA of the periodic table of elements. Examples of suitable metal ions are $Na^+$, $Li^+$ $K^+$, $Rb^+$, $Cs^+$, and the like, with $Na^+$ being preferred.

In an exemplary embodiment of the present invention, iron (II) cations for loading the exchange resin are generally provided in the form of water soluble salts, for example, chlorides of iron such as ferrous chloride although corresponding iodides, bromides and fluorides may also be suitable. Other sources of the magnetic metallic cations include for example, soluble salts such as water soluble iron acetate, nitrate, perchlorate, sulfate, thiocyanate, thiosulfate, nickel acetate, cobalt acetate, nickel chloride, cobalt chloride, and the like.

The magnetic precursor metallic cationic species of the transition metals are generally present in the polymer matrix so as to result in a solid particle which has the aforementioned desired magnetic properties. In embodiments for example, the magnetic resin contains about 0.001 weight percent to about 60 weight percent, and preferably from about 0.5 weight percent to about 20 weight percent of the cationic species in the form of a magnetic oxide. Accordingly, the polymer involved is present in an amount of from about 99 weight percent to about 40 weight percent and preferably from about 95 weight percent to about 85 weight percent.

The magnetic nanocomposite loaded resins of the present invention have high specific magnetization properties, as compared to the aforementioned low optional density magnetic $Fe_2O_3$ disclosed in U.S. Pat. No. 4,474,866. In embodiments, the nanocomposites of the present invention can have a specific magnetization of from about 90 to about 96 electromagnetic units per gram (emu/g) at about 25° C.

The magnetic nanocomposite compositions of the present invention, in embodiments, are superparamagnetic, that is, the nanocrystalline iron oxide particles within the resin composite matrix exhibit known superparamagnetic properties. The magnetic composites of the present invention can readily be characterized by the absence of magnetic hystersis and are so-called "soft" magnetic materials.

Depending on the particle size and shape of the iron oxide, the nanocomposite may exhibit coercivity and remanance when placed in a magnetic field. Generally, for particle sizes less than 10 nanometers, no coercivity or remanance is detectable and thus the material is considered superparamagnetic. For larger particles or particles having an elongated shape, that is acicular particles, coercivity and remanance may be observed. Thus, the magnetic nanocomposite may have a magnetic memory or no magnetic memory at room temperature depending on particle size and shape.

The nanocomposite compositions of the present invention exhibit a regular and predictable physical relationship between the magnetic metal oxide loading or weight ratio relative to the resin. Increased loading of metal oxide relative to resin leads to composites which are progressively more brittle or friable and more easily ground or milled into very fine particles but which highly loaded composites tend to behave less like a resin and more like a metal oxide with respect to mechanical processing and rheological properties. Thus, the magnetic metal oxide loading level is preferably less than about 60 weight percent based on the combined weight of magnetic metal oxide and resin.

One important specific embodiment of the present invention comprises the preparation of magnetic nanocomposite compositions having high magnetization and high spiking properties as illustrated herein.

In another embodiment of the present invention, there are provided processes for the preparation of magnetic nanocomposites as illustrated herein.

Further, processes of the present invention are directed to the preparation of magnetic nanocomposite particles which are useful in marking applications such as thermal, magnetic, acoustic or electrostatic ink jet inks, ferrofluids, liquid immersion development inks, carrier coatings, surface or bulk additives, as photoreceptor additives, and as toner additives.

Another specific embodiment of the present invention comprises a process for preparing liquid ink formulations which is achieved by, for example, forming a melt mixture comprised of a magnetic metal oxide nanocomposite or magnetic metal oxide loaded resin, an optional binder resin, a colorant, a charge director, a charge adjuvant, and optional performance additives; pulverizing the resulting melt mixture by known mechanical techniques such as ball milling, attrition, piston homogenization, and the like, into fine particles with a volume average diameter of from about 0.1 to about 15 microns useful as a dry developer; optionally treating the resulting fine particles with a silanating agent to cause the particles to become highly hydrophobic; and optionally suspending the fine particles in a non-dissolving aqueous or non aqueous liquid to form an ink formulation useful as a liquid developer.

The polymeric resins useful as a binder resins for a dry or liquid toner particle formation are selected from the group of homopolymers and copolymers obtained by polymerization of monomers selected from the group consisting of styrene compounds and derivatives thereof, such as ethyl styrene; unsaturated monocarboxylic acid compounds; unsaturated dicarboxylic acid compounds; vinyl ketones; vinyl naphthalenes compounds; and the like, and mixtures thereof.

Particularly useful ion exchange resins are NAFION® available from DuPont, poly(vinyl benzyl trimethyl ammonium chloride) and related polyelectrolytes, and LIGNOSITE™, such as sodium lignosulfonate, available from the Georgia-Pacific Corporation, Bellingham, Wash.

The colorant or pigment in addition to the black colored magnetic nanocomposite useful in developer marking formulations of the present invention is present in an amount of, for example, from about 0.1 to about 30, and preferably 20, percent by weight of the solids content of the developer and is selected from the group consisting of cyan, yellow, magenta, red, green, blue, brown, orange and black pigments such as REGAL 330® or dyes and mixtures thereof.

Illustrative examples of charge directors or charge adjuvants which are believed to function in controlling the sign and the magnitude of the charge on the liquid suspended developer particles that are useful in the present invention include: fatty acids or fatty acid salts as a negative charge directors and are selected from the group aluminum stearate and derivatives thereof, and aluminum t-butyl salicylate and mixtures thereof, and comprise from about 1 to about 15 percent by weight of the solids content of the developer. Among these compounds particularly useful and effective materials are aluminum stearate and block copolymers containing quaternary ammonium hydrogen halide salt side groups.

Examples of nonaqueous or non-dissolving solvents useful in the present invention as a solvent for the liquid developers and developer suspending medium are branched or linear aliphatic hydrocarbons, for example, NORPAR 15 and ISOPAR L or H, (available from Exxon) and mixtures thereof, having from 10 to 25 carbon atoms and which solvent is present from about 50 to about 98 percent of the total weight of the liquid developer.

In embodiments of the present invention, the liquid developer suspension comprising the magnetic nanocomposite particles, optional pigment or colorant, nonaqueous solvent, charge adjuvant, and charge director is optionally dispersed with high shear or ball milling to form suspended polymeric particles with a volume average diameter of from about 5 to about 100 microns. The suspended polymeric particles may be processed further by optionally thermally cycling or shocking the dispersion or suspension which is accomplished by rapidly heating the mixture from about 25° C. to about 100° C., then rapidly cooling to about 15° C. to about 40° C., wherein the cycle is accomplished over a period of about 1 minute to about 10 minutes.

A particle size reduction apparatus useful in the preparation of liquid ink formulations of the present invention is known as a piston homogenizer device whereby collisions of the suspended particles contained in the suspending media under high pressure emanating from a nozzle results in ultra high shear forces and fractures the suspended polymeric particles further into the desired size domain and range of from about 0.1 micrometers to about 5 micrometers volume average diameter. The pressure employed in the homogenization step is from about 100 Bars to less than about 500 Bars, and preferably of from about 100 to about 350 Bars. At pressures below the lower limit the particle size reduction is unsatisfactory and inefficient, and at pressures above about 350 Bars the dispersion appears to be destabilized and may lead to unacceptable and unmanageable shear thickening of the formulation.

The magnetic pigmented polymeric nanocomposite containing particles obtained have an area average particle diameter of from about 1.0 micron to about 2.5 microns as measured by, for example, an Horiba CAPA-500 centrifugation particle size analyzer, a volume average of particle diameter of from about 0.1 micron to about 5 micrometers as measured by, for example, the Malvern System 3601 and a particle geometric size distribution (GSD) of from about 1.2 to about 1.5.

The finely divided dry or liquid developer particles prepared by processes of the present invention may be optionally treated with surface additives to enhance development properties and performance thereof. Numerous surface and charge additives for improving the image performance of toner particle formulations are known in the art and are used in effective amounts of from about 0.01 to about 10.0 weight percent of the total marking particle content. The surface additives are comprised of fine powders of conductive metal oxides, metal salts, metal salts of fatty acids, colloidal silicas, titanates, quaternary ammonium salts, zwitterionic salts, metal complexes, organometallic complexes, or mixtures thereof.

Other surface additives having charge directing or control properties comprise a mixture of a colloidal silica or titanate, and an organoaluminum, organoboron, organozinc, organochromium complex of a salicylic acid or catechol.

Charge control additives for regulating the charging properties of the dispersed developer particles may be added to the surface of the dry developer particles by, for example, roll or cone milling, or may be adsorbed to the surfaces of the liquid dispersed particles.

Other types of high shear mixing or emulsification equipment, such as a piston homogenizer, a sonic (ultrasonic) emulsifier, a high shear homogenizer/emulsifier containing one or more sets of a rotor and stator combination, such as the Model 10CV Kady mill, the IKA in-line homogenizers and the Quadro in-line homogenizer, can also be used to prepare multiple-liquid phase ferrofluids such as binary, tertiary or ternary, and the like. This equipment can be modified to operate in either batch mode or continuous mode.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated. Results for selected samples are tabulated in Table 1.

EXAMPLE I

Preparation of Low Optical Density Magnetic Aqueous Ferrofluid

This preparative procedure corresponds substantially identically with that described in commonly assigned U.S. Pat. No. 5,358,659, Example I, the disclosure of which is incorporated by reference herein in its entirety. The resulting low optical density magnetic aqueous ferrofluid had physical, optical density, and magnetic properties substantially identical to those reported in the referenced U.S. Patent, reference Example I thereof.

EXAMPLE II

Preparation of High Magnetization Aqueous Ferrofluid

About 2 grams of an iron (II) (Fe 2+) loaded resin, hereinafter referred to a LODM, produced by the process described in Example I of the aforementioned commonly owned U.S. Pat. No. 5,358,659, was dry milled with about 200 grams of steel shot for 7 days ate 120 feet per minute and then wet milled for 16 hours after the addition of 20 mL of deionized water. The resulting colloidal suspension was centrifuged for 15 minutes at 8,000 Gs and the supernatant comprising a low optical density ferrofluid having a magnetization moment of less than about 20 emu/gram was decanted. The residual material remaining after decantation was exposed to a 2,000 Gauss bar magnet to separate a high magnetization ferrofluid material component from a low or non-magnetic residual sludge. The sludge is dark brown/black in appearance and the high magnetization material is black in color. Following this procedure, the desired high magnetization ferrofluid material component could be isolated in yields of from 0.1 to about 5 weight percent based on the weight of the dry starting material. The high magnetization ferrofluid material isolated from this Example had a magnetic moment of 36 emu/gram.

EXAMPLE III

Preparation of Ferrofluid A

About 100 grams of the LODM material was milled in a 1 gallon ceramic jar at 158 feet per minute for 11 days using 16 kg of ¼ inch stainless steel shot. About 2,000 grams of deionized water was added to the jar and milling continued for one day. After the fluid was removed from the shot, it was centrifuged 8 times at 6,000 Gs. The supernatant, after each pass in the centrifuge, was collected as ferrofluid. About 2,625 grams of the ferrofluid was ultrafiltered using a 10,000 molecular weight cut-off membrane. About 2,229 grams of the filtrate was discarded. This yielded 396 grams of ferrofluid having a density of 1.10 gram/mL, 13.5 weight percent solids, and a magnetization moment of 6.1 emu/gram at 4 kG.

EXAMPLE IV

Preparation of Ferrofluid B

About 300 grams of the LODM material was milled in a 3 gallon ceramic jar at 167 feet per minute for 14 days using 41 kg of ¼ inch stainless steel shot. About 6,000 grams deionized water was added to the jar and milling continued for one day. After the fluid was removed from the shot, it was centrifuged eleven times at 6,000 Gs. The supernatant, after each pass in the centrifuge, was collected as ferrofluid. About 8,536 grams of the ferrofluid was ultrafiltered using a 10,000 molecular weight cut-off membrane. About 6,934 grams of the filtrate was discarded. This yielded about 1,602 grams of ferrofluid having a density, as determined by weight and volume measurements, of 1.05 grams/mL, 8.4 weight percent solids, and a magnetization moment of 4.2 emu/gram at 4 kG.

EXAMPLE V

Preparation of Ferrofluid C

About 260 mL of ferrofluid A prepared in Example III was centrifuged at 8,000 Gs, 10 times at 15 minute intervals. The ferrofluid was ultrafiltered under 36 psi nitrogen gas using a 30,000 molecular weight cut-off membrane. About 155 mL filtrate was discarded. This yielded about 95 mL of a concentrated ferrofluid having a density of 1.20 gram/mL, 27 weight percent solids, and a magnetization moment of 9.7 emu/gram at 4 kG.

EXAMPLE VI

Preparation of Ferrofluid D

About 300 mL of ferrofluid B prepared in Example IV was centrifuged at 8,000 Gs, 10 times at 15 minute intervals. The ferrofluid was ultrafiltered under 36 psi nitrogen gas using a 30,000 molecular weight cut-off membrane. About 205 mL of filtrate was discarded. This yielded about 95 mL of a concentrated ferrofluid having a density of 1.15 grams/mL, 20 weight percent solids, and a magnetization moment of 8.0 emu/gram at 4 kG.

EXAMPLE VII

Preparation of Ferrofluid E

A sample of the ferrofluid C prepared in Example III was ultrafiltered under 36 psi nitrogen gas using a 30,000 molecular weight cut-off membrane while being rinsed with deionized water. This resulted in a concentrated ferrofluid which has a high iron oxide to polymer ratio, a density of about 1.47 gram/mL, 45 weight percent solids, and a magnetization moment of 20.2 emu/gram at 4 kG.

EXAMPLE VIII

Preparation of Ferrofluid F

Between each of the first five centrifuge intervals of ferrofluid A, as described in Example V, a one Tesla magnet was used to separate a highly magnetic, spiking fluid from the remaining sludge remaining in the bottom of the centrifuge tube. The sludge was discarded and the spiking fluid was placed in a vial previously silanated by exposure to about I mL of dichlorodimethylsilane. Placing the fluid in a silanated vial allowed the thin, long spikes to remain separated from one another at their base(s) and resulted in about a 200 percent spike height increase compared to fluid placed in a non-silanated vessel. The spiking fluid has a density, as determined by weight and volume measurements, of 1.27 gram/mL, 33 weight percent solids, and a magnetization moment of 19.4 emu/gram at 4 kG.

EXAMPLE IX

Preparation of Ferrofluid G

Between each of the first five centrifuge intervals of ferrofluid B, as described in Example VI, a one Tesla magnet was used to separate a highly magnetic, spiking fluid from the sludge remaining in the bottom of the centrifuge tube. The sludge was discarded and the spiking fluid was placed in a vial previously silanated by exposure to about 1 mL of dichlorodimethylsilane. Placing the fluid in a silanated vial allowed the thin, long spikes to remain separated from one another at their base(s) and resulted in about a 250 percent spike height increase compared to fluid placed in a non-silanated vessel. The spiking fluid has a density of 1.29 gram/mL, 36 weight percent solids, and a magnetization moment of 21.7 emu/gram at 4 kG.

EXAMPLE X

Preparation of Ferrofluid H

About 2 drops of dichlorosilane was added to 1 mL of ferrofluid F prepared in accordance with Example VIII. This resulted in a higher viscosity, gel-like ferrofluid which appeared to be lighter brown in color than ferrofluid F. The observed spiking phenomena was less relative to non-silanated ferrofluid F to give shorter and wider spikes. Ferrofluid H was non-wetting to ordinary glass surfaces compared to non-silanated ferrofluid F.

TABLE 1

| EXAMPLE/ SAMPLE | DENSITY (grams/mL) | MAGNETIZATION @ 4 kG (emu/gram): | % SOLIDS: |
|---|---|---|---|
| III/A | 1.10 | 6.1 | 13.5 |
| IV/B | 1.05 | 4.2 | 8.4 |
| V/C | 1.20 | 9.7 | 27 |
| VI/D | 1.15 | 8.0 | 20 |
| VII/E | 1.47 | 20.2 | 45 |
| VIII/F | 1.27 | 19.4 | 33 |
| IX/G | 1.29 | 21.7 | 36 |

The above mentioned patents and publications are incorporated by reference herein in their entirety.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process for the preparation of a high magnetization aqueous ferrofluid composition comprising:

providing a low optical density magnetic composition comprising a nanocomposite of particles comprising $Fe_2O_3$ nanoparticles and an ionic exchange resin;

milling the low optical density magnetic composition;

adding liquid vehicle to the composition and thereafter milling the resulting mixture to form a colloidal suspension;

treating the colloidal suspension to form a supernatant and a residue, and thereafter separating the supernatant from the residue; and exposing the residue to a magnetic field to generate a highly magnetic suspended component and a non- and low magnetic sludge components, wherein the highly magnetic component is an aqueous ferrofluid composition with a high magnetization moment of about 20 to about 40 emu/gram.

2. A process according to claim 1 further comprising treating the resulting aqueous ferrofluid composition with a reactive organosilane compound to form a silanated aqueous ferrofluid composition having a viscosity of from about $10^{-3}$ to about $10^{-1}$ Pa×sec at about 25° C., and wherein the surfaces of the magnetic nanocomposite particles of the ferrofluid are coated with a covalently bonded organosilane compound.

3. A process according to claim 2 wherein the reactive organosilane compound is selected from the group consisting of mono-, di-, and tri-halo substituted silane compounds containing substitutents independently selected from the group consisting of alkyl groups with from 1 to about 20 carbon atoms, aryl, and alkylaryl groups, with from 6 to about 25 carbon atoms.

4. A process according to claim 3 wherein the reactive organosilane compound is selected in an amount of from about 0.01 to about 2 weight percent based on the weight percent of the solids content of the aqueous ferrofluid.

5. A process according to claim 2 wherein the resulting aqueous silanated ferrofluid composition has a magnetization moment of about 30 to about 38 emu/gram.

6. A process according to claim 1 wherein the resulting aqueous ferrofluid composition has a magnetization moment of at least 34 emu/gram.

7. A high magnetization aqueous ferrofluid composition prepared by the process of claim 1.

8. A high magnetization silanated aqueous ferrofluid composition prepared by the process of claim 2.

9. A ferrofluid comprising an aqueous suspension of a nanocomposite comprised of $Fe_2O_3$ nanoparticles and an ionic exchange resin, wherein the ferrofluid has a high magnetization moment of about 20 to about 40 emu/gram.

10. A ferrofluid according to claim 9 wherein the ferrofluid has a high spiking or spicule forming property wherein the spicules or spikes are from about 1.0 to about 20 millimeters in height, wherein the spikes have a high aspect ratio of about 1:25, and a spicule resolution of about 1.0 millimeter at half peak height measured at a magnetic field of from about 200 to about 10,000 Gauss.

11. A ferrofluid according to claim 9 wherein the $Fe_2O_3$ nanoparticles are present in an amount of from about 20 to about 50 weight percent, and the ionic exchange resin is present in an amount of from about 80 to about 50 weight percent, and an aqueous phase is present in an amount of about 50 to about 90 weight percent based on the total weight of the ferrofluid.

12. A ferrofluid according to claim 11 wherein the aqueous suspension comprises from about 50 to about 90 weight percent water or a mixture of water and a water miscible solvent, and from about 10 to about 50 weight percent solids.

13. A ferrofluid according to claim 12 wherein the fluid is stable over a pH range of about 5 to about 10.

14. A ferrofluid according to claim 9 wherein the $Fe_2O_3$ nanoparticles have a volume average diameter of about 1 to about 10 nanometers.

15. A ferrofluid according to claim 9 wherein the aqueous suspension has a viscosity is from about $10^{-3}$ to about $10^{-1}$ Pa×sec at about 25° C.

16. A ferrofluid comprising an aqueous suspension of a silanated nanocomposite comprised of particles which are altered by treatment with a silanating agent comprised of the product of mixing a silane compound with nanoparticles of $Fe_2O_3$ and an ionic exchange resin, wherein the silanated ferrofluid has a high magnetization moment of about 20 to about 40 emu/gram.

17. A ferrofluid according to claim 16 wherein the ferrofluid has a high spiking or spicule forming property wherein the spicules or spikes are from about 1.0 to about 20 millimeters in height, wherein the spikes have a high aspect ratio of about 1:25, and a spicule resolution of about 1.0 millimeter at half peak height measured at a magnetic field of from about 200 to about 10,000 Gauss.

18. A ferrofluid according to claim 16 wherein the $Fe_2O_3$ nanoparticles are present in an amount of from about 20 to about 50 weight percent, and the ionic exchange resin is present in an amount of from about 80 to about 50 weight percent, and an aqueous phase is present in an amount of about 50 to about 90 weight percent based on the total weight of the ferrofluid.

19. A ferrofluid according to claim 17 wherein the aqueous phase comprises from about 50 to about 90 weight percent water or a mixture of water and a water miscible solvent, and from about 10 to about 50 weight percent solids.

20. A ferrofluid according to claim 19 wherein the fluid is stable over a pH range of about 5 to about 10.

21. A ferrofluid according to claim 16 wherein the $Fe_2O_3$ nanoparticles have a volume average diameter of about 1 to about 10 nanometers.

22. A ferrofluid according to claim 16 wherein the aqueous suspension has a viscosity greater than or equal to the viscosity of water at about 25° C.

23. A ferrofluid according to claim 16 wherein the fluid has a shelf life of from 1 to about 36 months.

* * * * *